United States Patent
Andre et al.

(10) Patent No.: US 9,903,277 B2
(45) Date of Patent: Feb. 27, 2018

(54) METHOD FOR MONITORING A FUEL CIRCUIT SHUT-OFF VALVE

(71) Applicant: SNECMA, Paris (FR)

(72) Inventors: Brice Andre, Montgeron (FR); Virginie Ayrault, Paris (FR); Bruno Robert Gaully, Marolles en Hurepoix (FR)

(73) Assignee: SNECMA, Paris (FR)

( * ) Notice: Subject to any disclaimer, the term of this patent is extended or adjusted under 35 U.S.C. 154(b) by 820 days.

(21) Appl. No.: 13/743,623

(22) Filed: Jan. 17, 2013

(65) Prior Publication Data

US 2013/0186096 A1    Jul. 25, 2013

(30) Foreign Application Priority Data

Jan. 20, 2012  (FR) ..................... 12 50579

(51) Int. Cl.
 *F02C 1/00*  (2006.01)
 *F02C 7/232*  (2006.01)
 *F02C 9/46*  (2006.01)

(52) U.S. Cl.
 CPC ............... *F02C 7/232* (2013.01); *F02C 9/46* (2013.01)

(58) Field of Classification Search
 CPC ............ F02C 7/232; F02C 9/46; F02C 9/263
 See application file for complete search history.

(56) References Cited

U.S. PATENT DOCUMENTS

| | | | | |
|---|---|---|---|---|
| 4,201,044 A | * | 5/1980 | Dodd | F02C 7/22 210/132 |
| 5,112,196 A | * | 5/1992 | Schuh | F04B 51/00 417/53 |
| 2004/0117102 A1 | * | 6/2004 | Weir | F02C 9/263 701/100 |
| 2008/0125930 A1 | | 5/2008 | Johnson | |
| 2008/0296403 A1 | | 12/2008 | Futa, Jr. et al. | |

FOREIGN PATENT DOCUMENTS

EP    1 154 137 A2    11/2001

OTHER PUBLICATIONS

Preliminary French Search Report dated Jul. 11, 2012 in Patent Application No. 1250579 (with English translation of Categories of Cited Documents).
U.S. Appl. No. 14/441,065, filed May 6, 2015, Gaully, et al.

* cited by examiner

*Primary Examiner* — Charles Freay
(74) *Attorney, Agent, or Firm* — Oblon, McClelland, Mair & Neustadt, L.L.P.

(57) ABSTRACT

The invention relates to a method for monitoring the operation of a fuel circuit shut-off valve comprising an LPSOV, a flow regulator, the shut-off valve, characterised in that it comprises:
 a step for ordering (30) the closure of the valves;
 a step for measuring (32) the fuel flow rate in the circuit qui carried out before the LPSOV is completely closed; and
 a diagnostic step (34) consisting of determining that said shut-off valve is defective if the fuel flow rate measured is not equal to zero and determining that said shut-off valve is operating correctly if the fuel flow rate measured is zero.

8 Claims, 1 Drawing Sheet

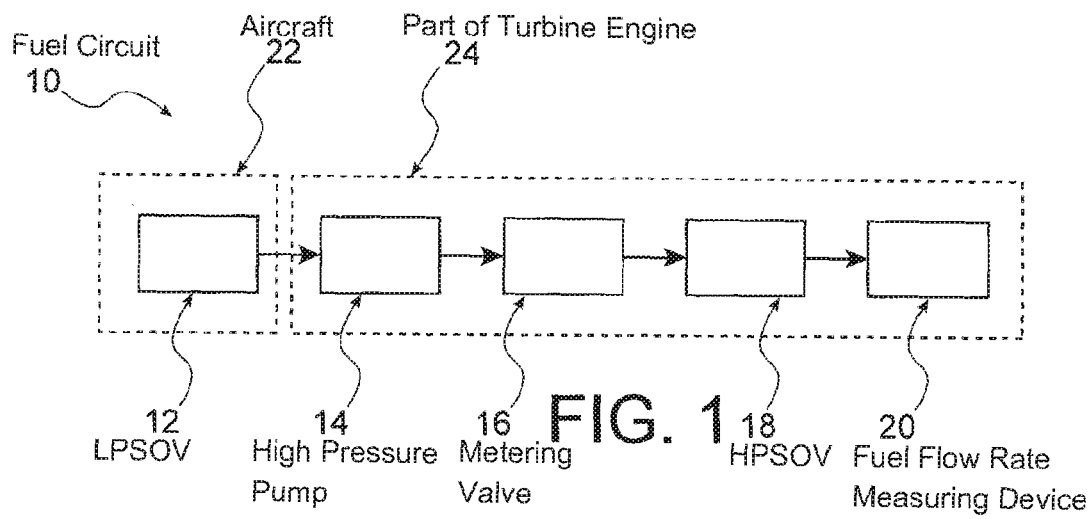
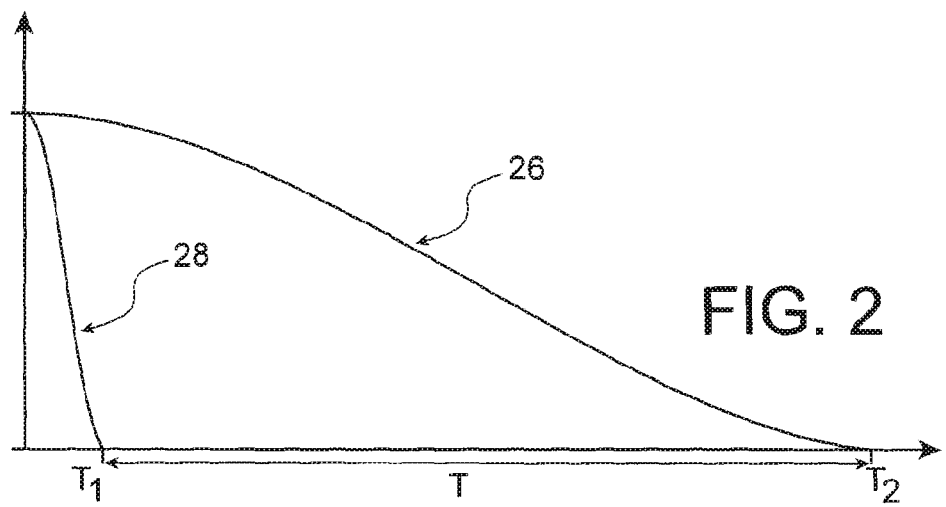
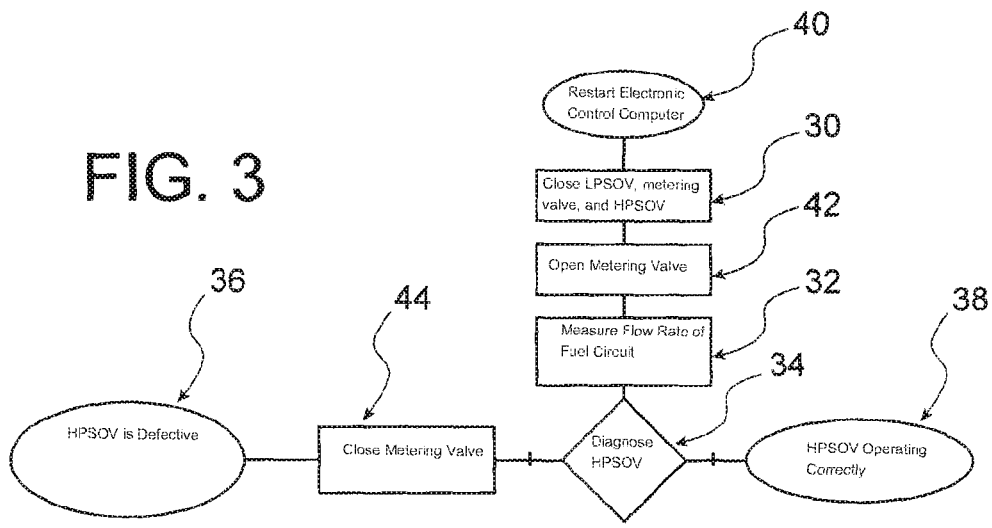

METHOD FOR MONITORING A FUEL CIRCUIT SHUT-OFF VALVE

FIELD OF THE INVENTION

The invention relates to a method for diagnosing the status of a turbine engine fuel circuit shut-off valve.

The invention relates more specifically to a method for monitoring whether the valve is indeed in the shut-off position thereof, without using position sensors.

STATE OF THE RELATED ART

In a turbine engine fuel circuit, numerous components are connected in sequence.

Among these components, the circuit comprises valves for shutting off the circuit completely. One valve is associated with a low-pressure upstream pump and is referred to as a Low Pressure Shut-Off Valve (LPSOV) and a second valve is associated with a high-pressure downstream pump and is referred to as a High Pressure Shut-Off Valve (HPSOV).

The purpose of the HPSOV is that of enabling or disabling the fuel supply of the turbine engine combustion chamber.

For safety reasons, it is important that the HPSOV shuts the circuit off effectively and to determine whether HPSOV is effectively closed or not.

For this purpose, according to one known embodiment, a position sensor, such as a proximeter, is associated with the HPSOV. This sensor is connected to an electronic computer to determine whether the HPSOV is closed or not.

The use of such a sensor increases the complexity of the turbine engine since it involves installing numerous additional components for the attachment thereof with respect to the HPSOV and for the electronic connection thereof to the computer; it also involves an increase in the mass of the turbine engine and an increase in the total cost of the turbine engine.

The aim of the invention is that of providing a method for checking the operation of the HPSOV not using a specific sensor associated with said HPSOV.

DESCRIPTION OF THE INVENTION

The invention relates to a method for monitoring the operation of an aircraft turbine engine fuel circuit shut-off valve, the circuit comprising, from upstream to downstream in the direction of fuel circulation, a low-pressure pump, an LPSOV, said shut-off valve and a device for measuring the fuel flow rate in the circuit, wherein the LPSOV closing time is greater than the closing time of said shut-off valve, characterised in that the method comprises:
a step for ordering the closure of the valves in the fuel circuit;
a step for measuring the fuel flow rate in the circuit carried out before the LPSOV is completely closed; and
a diagnostic step consisting of determining that said shut-off valve is defective if the fuel flow rate measured is not equal to zero and determining that said shut-off valve is operating correctly if the fuel flow rate measured is zero.

The measurement of the fuel flow rate downstream from the HPSOV, the operation whereof is to be checked, makes it possible to determine that the valve is effectively closed, if the flow rate measured is zero.

The LPSOV situated upstream from the HPSOV requires some time to close completely. A zero fuel flow rate means that the HPSOV is closed whereas a flow rate not equal to zero means that the valve is not completely closed.

Preferably, the circuit comprises a metering valve arranged between the LPSOV and said shut-off valve, wherein the closing rate is greater than the closing rate of the LPSOV, and the method comprises a step for ordering the opening of the metering valve carried out after the step for ordering the closure of the valves and before the step for measuring the fuel flow rate.

Preferably, if, following the diagnostic step, it is determined that said shut-off valve is defective, the diagnostic step is followed by a step for ordering the closure of the metering valve.

Preferably, the step for ordering the opening of the metering valve consists of ordering the opening of the metering valve so as to enable the flow of a predetermined fuel flow rate.

Preferably, the step for ordering the closure of the valves is carried out following a start-up sequence wherein an electronic computer of the turbine engine is started up and consists of inducing the closure of each valve.

Preferably, the diagnostic step is carried out by the computer and the step for ordering the opening of the metering valve is carried out after the computer start-up sequence.

The invention also relates to an aircraft turbine engine fuel circuit supplied with fuel by an aircraft low-pressure circuit comprising an LPSOV, the fuel circuit comprising, from upstream to downstream in the direction of fuel circulation, a high-pressure pump, a flow regulator, a fuel circuit shut-off valve, a device for measuring the fuel flow rate in the circuit, and an electronic control computer, characterised in that the electronic control computer is suitable for carrying out a method according to the invention.

Preferably, the device for measuring the flow rate consists of a mass flow meter.

The invention also relates to an aircraft turbine engine characterised in that it comprises a fuel circuit as defined above wherein the operation of the fuel circuit shut-off valve is monitored according to a method according to the invention.

BRIEF DESCRIPTION OF THE FIGURES

Further features and advantages of the invention will emerge on reading the detailed description hereinafter for which reference is made to the appended figures wherein:

FIG. 1 is a schematic representation of a fuel circuit wherein the method according to the invention is carried out;

FIG. 2 is a graph representing the HPSOV and LPSOV closing times;

FIG. 3 is a diagram representing the method according to the invention.

DETAIL DESCRIPTION OF PARTICULAR EMBODIMENT

FIG. 1 represents a fuel circuit 10 of a turbine engine such as an aircraft turbo-prop.

The circuit 10 comprises, from upstream to downstream in the direction of fuel circulation in the circuit, an LPSOV 12, a high-pressure pump 14, a metering valve 16, an HPSOV 18 and a device for measuring the fuel flow rate in the circuit 20.

The circuit opens into the fuel injection circuit of the turbine engine combustion chamber (not shown).

The LPSOV 12 is arranged in the vicinity of a low-pressure pump (not shown), in a separate part of the aircraft 22 from the turbine engine. The other components are arranged in a part 24 of the turbine engine.

The LPSOV 12 and the HPSOV 18 each have the function of completely shutting off the fuel circulation in the circuit 10, particularly as a safety precaution.

The high-pressure pump 14 makes it possible to increase the fuel pressure to reach a sufficient pressure for the injection of the fuel in the turbine engine combustion chamber.

The metering valve 16 makes it possible to regulate the fuel flow rate supplied to the combustion chamber.

The flow meter 20 measures the fuel flow rate supplied to the combustion chamber, so as to monitor the metering valve 16.

In this case, the flow meter 20 consists of a mass flow meter using torque meter technology for example.

All the valves 12, 16, 18 and the flow meter 20 are connected electronically to an electronic control computer (not shown) via which the position of each valve is controlled, based on the current or desired turbine engine operating conditions.

As mentioned above, the HPSOV 18 is suitable for shutting off the fuel circuit 10 completely, thus shutting off the fuel supply of the combustion chamber.

If the HPSOV 18 is defective, the combustion chamber may still be supplied with fuel, which may give rise to a certain risk.

FIG. 3 represents a diagram representing the various steps of a method for monitoring the proper operation of the HPSOV 18. Preferably, this method is carried out by the electronic control computer mentioned above.

The method comprises a first step 30 consisting of simultaneously ordering the closure of the LPSOV 12 and the HPSOV 18.

FIG. 2 represents two curves representing the fuel flow rate variation output from each valve 12, 18 during the closure of the valve 12, 18. The first curve 26 situated furthest to the right is the curve associated with the LPSOV 12, the second curve 28 is associated with the HPSOV 18.

As can be seen, the closing rate of the LPSOV 12 is less than the closing rate of the HPSOV 18.

In this way, in the time interval T between the time T1 from which the HPSOV 18 is closed and the time T2 from which the LPSOV 12 is closed, only the HPSOV 18 is completely closed.

If the HPSOV 18 is not closed in this time interval, a predetermined fuel flow rate will circulate in the circuit 10.

In this way, by measuring the fuel flow rate in the circuit 10 for the time interval T, it is possible to determine whether the HPSOV 18 is effectively closed or not.

The method for monitoring the HPSOV 18 comprises a step 32 for measuring the fuel flow rate in the circuit 10 at a time situated in this time interval T, i.e. after the closure of the HPSOV 18 and before the LPSOV 12 is completely closed.

This measurement step 32 is followed by a diagnostic step 34 consisting of determining that the HPSOV 18 is defective (item 36) if the fuel flow rate measured is not equal to zero and determining that the HPSOV 18 is operating correctly (item 38) if the fuel flow rate measured is zero.

According to one preferred embodiment, the method is carried out following a phase 40 for restarting the electronic control computer to which the valves 12, 16, 18 and the flow rate measurement device 20 are connected electrically.

The electronic control computer carries out the method according to the invention, i.e. it particularly carries out the diagnostic step 34.

The restarting phase 40 also activates the step 30 for closing the valves. Preferably, the closure of the valves consists of automatic closure of the HPSOV 18 and LPSOV 12 after switching off the electrical power supply thereof.

In addition, the closure of the metering valve 16 is activated during this restarting phase 40, such that the closing step 30 consists of ordering the closure of the LPSOV 12, the metering valve 16 and the HPSOV 18.

The closing time of the metering valve 16 is relatively short, i.e. similar to the closing time of the HPSOV 18.

In this way, if the measuring step 32 is carried out while the metering valve 16 is closed, the flow rate measured will be zero regardless of the operating status of the HPSOV 18.

For this reason, the method comprises a step 42 for ordering the opening of the metering valve 16 which is carried out after the step for closing the valves 30.

The step for ordering opening 42 consists of partially opening the metering valve 16 to enable the circulation of a predetermined fuel flow rate in the circuit, which is sufficiently high to enable the detection of a flow rate by the measurement device.

Following the diagnostic step 34, if it is determined that the HPSOV 18 is defective, this means that a predetermined fuel flow rate has been measured, the fuel flow rate supplying the combustion chamber.

To prevent any risk of the turbine engine restarting, the method comprises a step 44 for ordering the closure of the metering valve 16 which is after the diagnostic step 34, if it has been determined that the HPSOV 18 is defective (36).

The invention claimed is:

1. A method for monitoring the operation of a high pressure shut-off valve (HPSOV) of an aircraft turbine engine fuel circuit, the circuit comprising, from upstream to downstream in the direction of fuel circulation, a low-pressure pump, a Low Pressure Shut-Off Valve (LPSOV), a high-pressure pump, a metering valve, said HPSOV, and a device for measuring the fuel flow rate in the circuit, wherein a LPSOV closing time is greater than a closing time of said HPSOV, and wherein a closing rate of the HPSOV is greater than a closing rate of the LPSOV, the method comprising:
   ordering closure of the LPSOV, the metering valve, and the HPSOV in the fuel circuit;
   ordering opening of the metering valve;
   measuring fuel flow rate in the fuel circuit carried out before the LPSOV is completely closed; and
   diagnosing the HPSOV including determining that said HPSOV is defective if the fuel flow rate measured is not equal to zero and determining that said HPSOV is operating correctly if the fuel flow rate measured is zero.

2. The monitoring method according to claim 1, wherein, if said HPSOV is determined to be defective, the method further comprises ordering closure of the metering valve.

3. The monitoring method according to claim 1, wherein the ordering the opening of the metering valve includes ordering the opening of the metering valve so as to enable the flow of a predetermined fuel flow rate.

4. The monitoring method according to claim 1, wherein the ordering the closure of the LPSOV, the metering valve, and the HPSOV is carried out following a start-up sequence in which an electronic computer of the turbine engine is started up, and the start-up sequence includes inducing the ordering closure of each of the LPSOV, the metering valve, and the HPSOV.

5. The monitoring method according to claim 4, wherein the diagnosing is carried out by the electronic computer and the ordering the opening of the metering valve is carried out after the start-up sequence.

6. An aircraft turbine engine fuel circuit comprising, from upstream to downstream in a direction of fuel circulation, a low-pressure pump, a low pressure shut-off valve (LPSOV), a high-pressure pump, a metering valve, a high pressure shut-off valve (HPSOV), a device for measuring the fuel flow rate in the fuel circuit, and an electronic control computer,
    wherein a LPSOV closing time is greater than a closing time of said HPSOV,
    wherein a closing rate of the HPSOV is greater than a closing rate of the LPSOV, and
    wherein the electronic control computer is configured to
        order closure of the LPSOV, the metering valve, and the HPSOV in the fuel circuit;
        order opening of the metering valve;
        measure fuel flow rate in the fuel circuit carried out before the LPSOV is completely closed; and
        diagnose the HPSOV including deteii lining that said HPSOV is defective if the fuel flow rate measured is not equal to zero and determining that said HPSOV is operating correctly if the fuel flow rate measured is zero.

7. A fuel circuit according to claim 6, wherein the device for measuring the flow rate includes a mass flow meter.

8. An aircraft turbine engine comprising:
    a fuel circuit comprising, from upstream to downstream in a direction of fuel circulation, a low-pressure pump, a low pressure shut-off valve (LPSOV), a high-pressure pump, a metering valve, a high pressure shut-off valve (HPSOV), and a device for measuring the fuel flow rate in the fuel circuit; and
    an electronic control computer,
    wherein a LPSOV closing time is greater than a closing time of said HPSOV,
    wherein a closing rate of the HPSOV is greater than a closing rate of the LPSOV, and
    wherein the electronic control computer is configured to
        order closure of the LPSOV, the metering valve, and the HPSOV in the fuel circuit;
        order opening of the metering valve;
        measure fuel flow rate in the fuel circuit carried out before the LPSOV is completely closed; and
        diagnose the HPSOV including determining that said HPSOV is defective if the fuel flow rate measured is not equal to zero and determining that said HPSOV is operating correctly if the fuel flow rate measured is zero.

\* \* \* \* \*

UNITED STATES PATENT AND TRADEMARK OFFICE
CERTIFICATE OF CORRECTION

PATENT NO. : 9,903,277 B2
APPLICATION NO. : 13/743623
DATED : February 27, 2018
INVENTOR(S) : Brice Andre et al.

It is certified that error appears in the above-identified patent and that said Letters Patent is hereby corrected as shown below:

On the Title Page

Item (74) Attorney, Agent, or Firm, change "Mair" to --Maier--; and

In the Claims

Column 5, Line 24, change "including deteii lining that" to --including determining that--.

Signed and Sealed this
Twenty-eighth Day of April, 2020

Andrei Iancu
*Director of the United States Patent and Trademark Office*